Jan. 30, 1968
G. L. BROWN
3,366,924
METHOD AND APPARATUS FOR DIGITAL PROCESSING
MULTI-TRACE SEISMIC RECORDS
Filed March 28, 1966
5 Sheets-Sheet 1

INVENTOR.
GRAYDON L. BROWN
BY
William J. Miller
ATTORNEY

Jan. 30, 1968               G. L. BROWN               3,366,924
METHOD AND APPARATUS FOR DIGITAL PROCESSING
MULTI-TRACE SEISMIC RECORDS
Filed March 28, 1966                                         5 Sheets-Sheet 3

FIG. 4

INVENTOR.
GRAYDON L. BROWN
BY
William J. Miller
ATTORNEY

United States Patent Office 3,366,924
Patented Jan. 30, 1968

3,366,924
METHOD AND APPARATUS FOR DIGITAL PROCESSING MULTI-TRACE SEISMIC RECORDS
Graydon L. Brown, Ponca City, Okla., assignor to Continental Oil Company, Ponca City, Okla., a corporation of Delaware
Filed Mar. 28, 1966, Ser. No. 538,085
19 Claims. (Cl. 340—15.5)

ABSTRACT OF THE DISCLOSURE

A method and apparatus for digitally processing multi-trace seismic records by deriving analog electrical signals from each seismic trace, controlling the rate of the derived electrical signals by using a reference timing signal, multiplexing the derived electrical systems at a constant sampling rate and storing the digital equivalence at the same constant storage rate.

This invention relates to improvements in the art of processing and intrepretation of geophysical records, and more particularly, but not by way of limitation, it relates to an improved method for the conversion of multi-trace seismic records from analog to digital representation in order to enable various digital processing measures; and it further includes the option of reconversion from digital to analog form for subsequent storage and/or presentation.

The subject matter disclosed herein is related to a copending application, Ser. No. 507,912 entitled, "Method and Apparatus for Seismic Signal Processing."

The present invention contemplates a method wherein plural analog traces representative of certain seismic signal returns can be multiplexed, digitalized and placed in permanent storage in a computer-compatible format for subsequent retrieval for further processing, playback or whatever. More particularly, the invention contemplates a method of processing wherein analog seismic signals are played back from a field record or primary analog storage facility at predetermined speed which is controlled to vary with any recording speed variations experienced during the initial or prior recording of the seismic signals. The recovered analog seismic signals are then multiplexed at a preset scanning rate and thereafter converted from analog form to their respective digital equivalents for intermediate storage; the stored digital signals are then read out of the intermediate storage and applied to digital write circuits to produce a computer-compatible record. The sampling or scan time of the multiplexing operation as well as the analog to digital conversion synchronization and digital write control are clocked from a basic timing source. This timing source is further utilized along with a field recorded reference signal to control the speed of playback of the analog seismic signals.

The present invention contemplates a synchronous processing system for reversibly carrying out the signal processing method as set forth above, the system including attendant analog signal equipment for deriving plural channels of seismic information for application to multiplexing equipment, analog/digital conversion stages, intermediate storage and format controlled digital write apparatus. The integrated system would also provide for the reversible playback of digital information through storage, digital to analog conversion and decommutation for reapplication to the analog signal equipment for further signal shaping and analog signal recording.

Therefore, it is an object of the present invention to provide a method of multiple seismic signal processing wherein the analog signal values can be converted into their digital equivalent values and thereafter stored in computer-compatible format such that individual trace informations are retrievable in their proper order and relationship with respect to the time break or zero time of the particular seismic record.

It is a further object of this invention to provide a synchronous system for digitalizing multi-trace seismic data in a manner whereby the rate of sampling and multiplexing of the multiple trace information is controlled from a precision timing source in such a manner that an accurate time base for the data is maintained without the need for recording time values or indications, digital or otherwise.

It is also an object of the invention to provide a system, including the attendant analog equipment, for reproducing field recorded seismic information and thereafter multiplexing and digitalizing said information for storage in computer-compatible format such that the digitalized seismic information is readily available for further digital signal processing or for reconversion to analog and reconstitution of the analog seismic information.

Finally, it is an object of the present invention to provide a method and apparatus which enables digitalization of a multi-trace seismic record and the subsequent digital recording thereof in a manner whereby the real time or signal travel time relative to the time base of the origianl multi-trace seismic record is retained in the digital recording by means of the format or storage disposition of the successive digital values.

Other objects and advantages of the invention will be evident from the following detailed description when read in conjunction with the accompanying drawings which illustrate the invention.

Figures 1, 2:
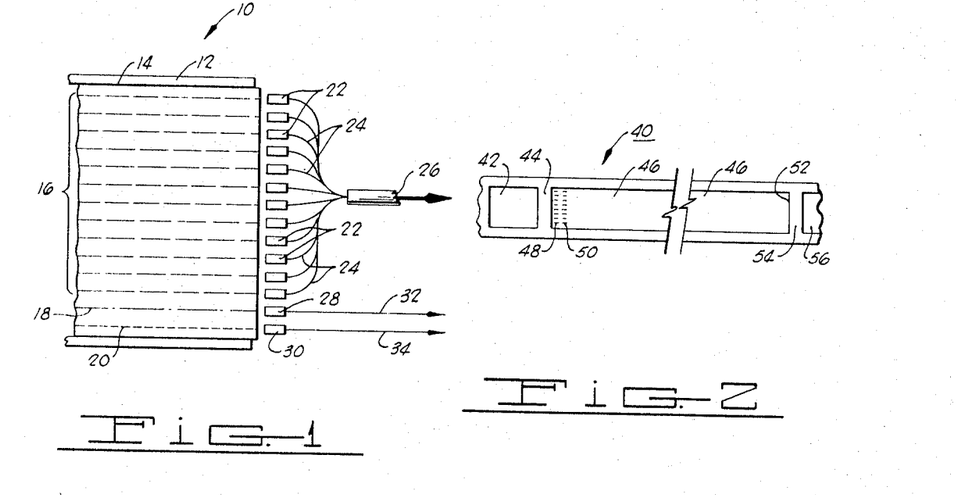
FIG. 1 illustrates a seismic field recording aligned for analog signal playback in accordance with the present invention.
FIG. 2 illustrates a form of computer-compatible digital tape having a format as preferred in the present invention.

It is proposed that the present method utilize multi-trace seismic records including a reference timing signal as recorded in the field; however, it may be desirable to utilize intermediately recorded records which result from certain analog seismic signal processing applications. FIG. 1 shows an exemplary form of analog record and recording components but there are many similar types of analog apparatus, widely used in the art, which are suitable for providing the input information. FIG. 1 shows an analog transport 10 consisting of a recording drum 12 which is driven in rotation by a suitable drive. The recording drum 12 carries a record material or belt 14 on its circumference.

The record medium 14 is a multi-channel magnetic belt in this instance and is shown here as containing fourteen separate recording channels evenly spaced across its width.

Twelve channels, indicated by the bracket 16, are for receiving analog seismic information as might be received from each of the plural detectors in a multiple geophone array over a period of three to six seconds recording time. The channel 18 (dot-dash line) may receive time break information, the zero reference point for the family of seismic data curves. The time break information may be gathered in any of several ways in the field such as by a detector positioned adjacent the shot source. The channel 20 (dash line), the fourteenth recording channel, has recorded thereon a reference timing signal which provides an indication of speed variation of the analog transport 10 as will be further described. The reference timing signal as generated in the field is a constant frequency signal of high precision, and after it is recorded on the field record contained on recording medium 14, any variations in frequency will represent a fluctuation in the speed of the recording drum which was employed in the field. That is, field recording speed variations will be frequency modulated on the reference timing signal on channel 20. It should be understood that it is also common practice to employ ten channels 16 of seismic trace information and the present method (FIGS. 5 and 6) provides alternatives for processing such records.

When the field record 14 is placed on analog transport 10 for playback, each of the recording channels is aligned with a playback head. Each channel of the seismic trace group 16 is aligned with a respective playback head 22 and each playback head 22 provides its output signal on a lead 24 to a distribution cable, indicated as 26. The distribution cable 26 would then apply the individual seismic trace analog signals in parallel to the processing system as will be further described. The time zero or time break channel 18 is aligned with a playback head 28 to provide a signal output on a lead 32, and the reference timing signal contained in channel 20 is played back through a head 30 for output on a lead 34 to the signal processing system.

The field record 14 of FIG. 1 shows a fourteen channel record, however, it should be understood that the number and spacing of channels is a matter of choice with wide selections being available in the related art. For example, a well known type of analog system deals with 28 channel recording capacity and some have even greater capacities, depending upon the exigencies of the field situation. In the case of a 28 channel analog playback system, as will be further described herein, it is common practice to utilize half of the 28 channels for a first recording of a seismic trace family (i.e., for twelve traces) and the remainder or second half of the 28 channels for a different shot sequence. The processing then follows similarly with successive playback of channels No. 1 through No. 14 and then channels No. 15 through No. 28. The operation of plural channel analog systems is well-known in the art and generally arranged as a matter of choice by means of patchboards, relay networks or whatever.

The method and system as proposed herein accepts the plural channels of seismic information on parallel inputs 26 along with the time zero information in input 32 and the reference timing signal on input lead 34, and thereafter performs a digitalization process to prepare the seismic information for storage in computer-compatible format. As previously stated, the reference timing signal on lead 34 is utilized for the synchronism of the seismic trace information through the digitalization process so that the real time of the seismic signals will not be lost. Similarly, the time zero information on lead 32 provides a starting or zero reference, also for preserving the real time relationships of the signals. The plural channels of seismic information can then be multiplexed to a single time sequential analog signal and thereafter converted analog to digital for subsequent intermediate storage and digital recording in the proper format (as will be described).

FIG. 2 depicts a section of digital tape 40 which illustrates the various facets of the digital storage format. The digital tape 40 may be the standard one half inch IBM recording tape stored or contained on reels of 10½ inch diameter in known manner. A first recording space, an identification word or header block 42, is utilized for recording file identification information. Each identification word 42 may be recorded in suitable manner such as in binary coded decimal form, and each analog recording tape may be numbered by a six decimal digit number. This number can be easily recorded under operator control as, for example, by six thumbwheel decimal switches actuable from the operators console. Six additional decimal switches may possibly be employed for encoding other information in decimal format which would provide useful operating information pertinent to the particular field recording.

The identification word 42 is then followed by an inter-record gap 44 which is followed by the data file 46. The data file 46 would contain all of the seismic information with each data value (each individual sample of each channel) represented by 11 bits, including sign, plus a channel flag bit recorded in two characters across the data file 46. The column or rows 48 and 50 represent lateral recording areas, each of which would receive one character recorded preferably in binary code. In addition, proper lateral parity may be inserted for each character. The individual character pairs for each successive data value of the time sequential digital equivalents are recorded serially along the data file 46 until the complete analog information is processed at which time an end of file 52 is actuated, with suitable longitudinal parity inserted, and this is followed by a file gap 54. Thus, the identification word 42 and attendant data file 46, representing a complete family of seismic trace information, would be followed by a next digitalized seismic record as identified by the following header or identification word 56.

The tape speed and packing density of the digital tape are a matter of choice, depending upon the choice of equipment employed in the system. However, the present system functions to good advantage employing a packing density of 556 bits per inch and a digital tape speed of 43.165 inches per second with twelve channel capacity (or 35.971 i.p.s. with ten channel capacity). A standard reel of digital recording tape may then contain up to 200 individual digital seismic records, that is, an identification word 42 followed by a data file 46 representing a particular family of seismic traces.

Figure 3:
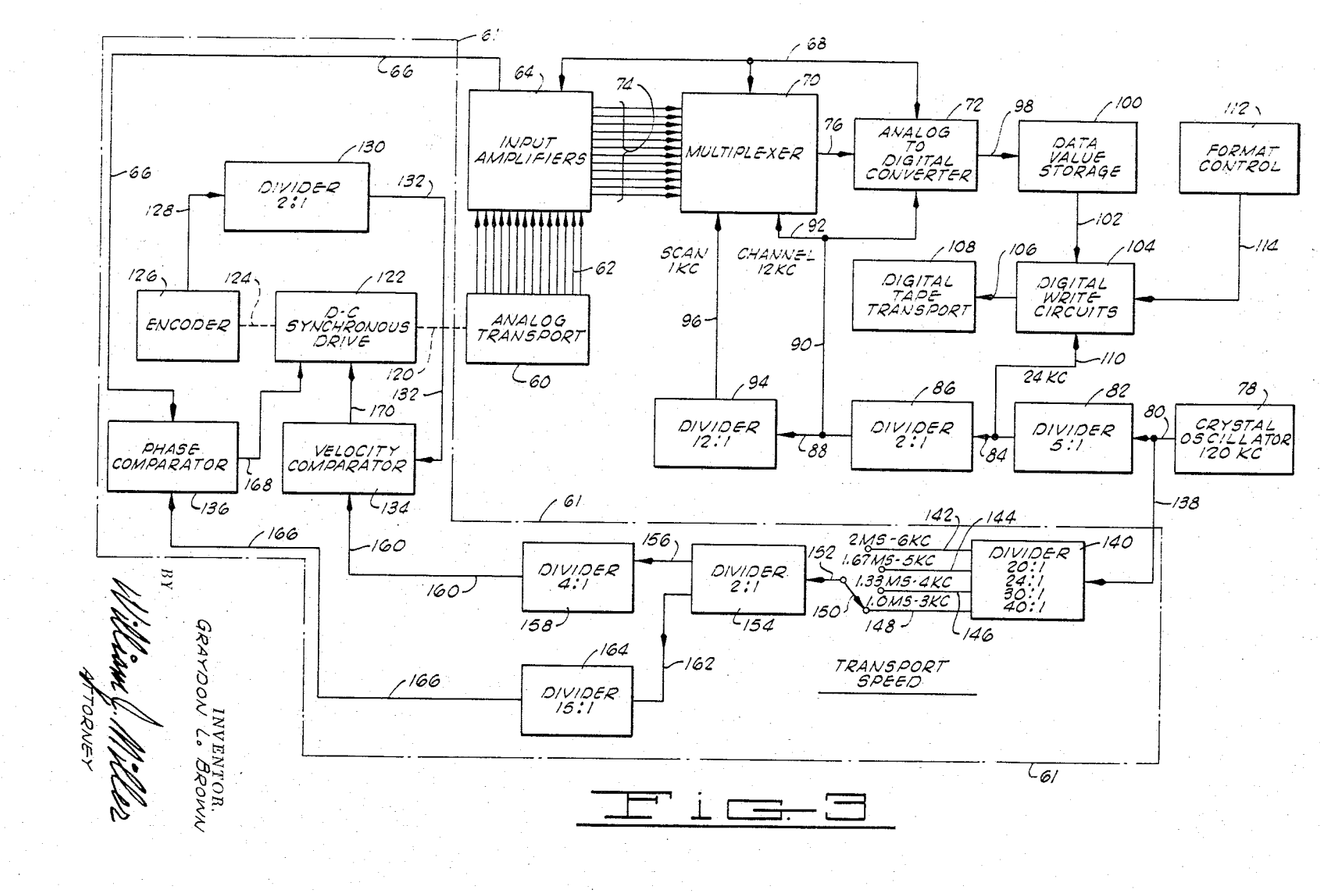
FIG. 3 is a system block diagram for performing the analog to digital processing phase of the present method.

FIG. 3 illustrates an exemplary form of system for carrying out the method utilizing a plural channel analog input to provide a coded digital output for storage in computer-compatible format. The system of FIG. 3 illustrates a first phase of the method or the analog to digital conversion mode. The FIG. 3 system employs an analog transport 60 which is utilized to playback the multi-trace seismic field recording, such as record medium 14 of FIG. 1. In the following disclosure it will be assumed that the field record was recorded at the usual field recording speed of 3.6 inches per second and that the reference timing signal generated in the field was of a value of 100 cycles per second. Hence, when the field recording takes place at the proper recording speed, the recorded reference timing signal will be at 100 cycles per second; however, any variations in the recording transport speed will cause proportional changes in the frequency of the played back reference timing signal, a frequency modulated error indication. Speed control of analog transport 60 is performed by speed control circuitry within dash-dot line 61 as will be further described.

A plurality of output leads 62 conduct each of the plural seismic traces, the time break reference, and the reference timing signal to respective amplifiers in a bank of input amplifiers 64. The input amplifiers 64 may be conventional types well-known in the geophysical and related electronic arts. The amplified reference timing signal (100 c.p.s. at 3.6 inches per second recording speed) is conducted on a lead 66 for return to the analog transport speed control 61 as will be further described. An amplified replica of the zero time pulse is applied on line 68 to a multiplexer 70 and an analog to digital converter 72 where it is employed as an enabling or initiation pulse. The plurality of output leads 74 conducts each of the amplified analog seismic signals to respective inputs at the multiplexer 70. The multiplexer 70 receives each of the plural analog seismic signals and performs sampling of successive channels in well-known manner to form a single, time sequential analog voltage on output lead 76 which is then applied to the analog to digital converter 72.

The scan and channel switching pulses for operation of multiplexer 70 and the analog to digital converter 72 are derived from a basic precision frequency source, a crystal oscillator 78. The present disclosure sets forth an exemplary sampling or frame rate wherein the scan rate is 1 kc. and the channel switching rate is 12 kc. and therefore the crystal oscillator 78 is here specified as having a frequency of 120 kc. The output from crystal oscillator 78 on lead 80 is applied to a 5:1 divider 82 to derive a 24 kc. output on a lead 84. The 24 kc. signal on lead 84 is further divided in a 2:1 divider 86 and a 12 kc. output, the channel switching frequency, is present on a lead 88 and leads 90 and 92 for application to the channel switching inputs of the multiplexer 70 and the analog to digital converter 72. The 12 kc. signal present on lead 88 is also further divided in a 12:1 divider 94 to derive a 1 kc. signal, the scan frequeny, for application on a lead 96 to the multiplexer 70.

Thus, no matter what the data presention rates to the multiplexer 70, the individual channels of input (leads 74) will be sampled such that all channels will be scanned at a 1 kc. rate with individual channel switching evenly divided at the 12 kc. rate. The multiplexer 70 may be a conventional well-known type of circuit which serves to accept plural channels of analog information and provide a time sequential analog output voltage on the lead 76. The various frequency dividers referred to throughout the specification may be flip-flop circuits interconnected for proper division ratios in conventional manner.

The analog to digital converter 72 may also be selected from various commercially available units. Analog to digital converter 72 preferably encodes or digitizes in binary format to at least eleven bits, including sign, and it should have sufficient resolution to the least significant bit. Conversion time should not exceed seventy-five microseconds, thus allowing a maximum sampling rate of 12 kc. which will enable a satisfactory data handling rate for a twelve channel system. One form of converter which may be employed is that known as the binary-weighted, resistor ladder network. Such a converter enables conversion up to twelve binary bits and, further, it is reversible and can be used in the digital to analog phase of the system to be described below. The analog to digital converter 72 receives a channel switching input at a 12 kc. rate on lead 90 to initiate the data conversion of the individual samples as they are sequentially presented on lead 76.

The binary coded digital equivalents are then shifted out successively from the analog to digital converter 72 via lead 98 for input to data value storage 100. Data value storage 100 may be a conventional twelve-bit intermediate storage facility which is employed for holding digital voltage indications for subsequent parallel character readout. The digital write circuits 104 accept the digital equivalent information on lead 102 and apply it on lead 106 to the digital tape transport 108 under the control of a 24 kc. clocking rate applied on lead 110. The 24 kc. clocking frequency is obtained from the crystal oscillator 78 after count down through the 5:1 divider 82. A format control 112, shown connected via line 114 to the digital write circuits 104, controls the format or the application of the digital information to the digital tape transport 108 and, as stated before, this is preferably two parallel characters per data value. That is, sequentially applied parallel digital characters of five and six bits each along with an odd parity bit for each character. A flag bit may be employed, and this is a matter of choice as to placement and marking functions, e.g., a flag bit can be inserted in the first character of each No. 1 channel data value or selected multiples thereof.

Thus, no matter what the data input to the multiplexer 70, the scan, channel switching, and digital write rates will be constant as controlled from a crystal oscillator 78. This crystal oscillator output is also counted down and fed back to the analog transport speed control system 61 to enable accurate following of the analog transport 60. That is, if the analog transport 60 is playing back a section of field record which for some reason was pulled off its standard or intended speed of 3.6 inches per second, the speed correction system can react to change the speed of analog transport 60 to counteract for the discrepancy. In this manner all data values applied to the multiplexer 70 and subsequent conversion and recording circuitry will have a real or field time relationship with respect to the time break or intial zero reference. The speed control circuitry 61 also enables a multiple of sampling rates by controlling the playback speed of analog transport 60 as will be further described.

Analog transport 60 receives direct rotational drive on a shaft 120 from a D-C synchronous drive 122. The D-C synchronous drive 122 also provides rotational indication on a shaft 124 to an encoder 126 which provides a speed measurement. The encoder 126 is preferably a photoelectric encoder actuated by a slotted disc to provide a frequency output which is a measure of speed on lead 128 to a 2:1 divider 130 which provides a divided output on lead 132 to a velocity comparator 134. The amplified reference timing signal, as played back from analog transport 60 and amplified in the input amplifier bank 64, is applied on lead 66 to one input of a phase comparator 136. Additonal standard inputs for application to both the velocity comparator 134 and the phase comparator 136 are derived from the basic frequency source, the crystal oscillator 78. The 120 kc. output from crystal oscillator 78 on output 80 is applied on a lead 138 to a plural ratio divider 140 which divides at ratios of 20:1, 24:1, 30:1 and 40:1. Thus, in accordance with the ratios of division, outputs of 6 kc., 5 kc., 4 kc., and 3 kc. are present on the respective outputs 142, 144, 146 and 148 to the selector switch 150. The selector switch 150 enables the sampling rate selection by varying the frequency of the standard signals fed back for comparison in the velocity comparator 134 and the phase comparator 136.

The signal from selector switch 150 is then applied on a lead 152 to a 2:1 divider 154 which provides dual outputs. The first output on lead 156 is further counted down through a 4:1 divider 158 to provide a first standard signal or velocity reference signal on lead 160 to the velocity comparator 134. In accordance with the position of selector switch 150, the velocity reference on lead 160 may have a frequency of 750, 625, 500 or 375 cycles per second to enable respective sampling rates of 2 milliseconds, 1.67 ms., 1.33 ms. or 1.0 ms. which, in turn, is effected by enabling the respective speeds of 7.2 inches per second, 6.0 i.p.s., 4.8 i.p.s. or 3.6 i.p.s. for the analog transport 60. A second output from the 2:1 divider 154 is present on a lead 162 to a further countdown circuit, a 15:1 divider 164, and the output is present on lead 166 to the phase comparator 136. Also, depending upon the setting of the sampling rate selector switch 150, the phase lock signal on lead 166 will have frequencies of 200 cycles per second, 167 c.p.s., 133 c.p.s. and 100 c.p.s.

Thus, the sampling rate selector switch 150 controls the sampling rate by frequency selection which actually varies the rotational velocity of the analog transport 60. Therefore, as shown in FIGURE 3, the selector switch 150 provides a 3 kc. input to the 2:1 divider 154 which effects a 375 c.p.s. signal output on velocity reference lead 160 to the velocity comparator 134. Similarly, a phase lock signal at a frequency of 100 cycles per second is present on the phase lock lead 166 to the phase comparator 136. Since the seismic field record was recorded at 3.6 inches per second with a reference timing frequency of 100 cycles per second, the signal fed back on lead 66 to the input of phase comparator 136 is compared with the phase lock voltage on lead 166 and the output from the phase comparator 136 is applied on a lead 168 to drive the D-C synchronous drive 122. Similarly, the velocity (rotational speed) measurement frequency from encoder 126 through divider 130 is applied on a lead 132 to the velocity comparator 134, and comparison with the velocity reference voltage on lead 160 provides a further output on a lead 170 for application to drive the D-C synchronous drive 122. The combined effect is to control the D-C synchronous drive such that it maintains the proper null comparison between the velocity and phase inputs to the respective comparators 134 and 136. Such a transport speed control system is the particular subject matter of the U.S. Patent Application No. 391,410 entitled "Motor Control Servo System," filed Aug. 24, 1964 in the name of Brown et al. and assigned to the present assignee.

In operation of the FIGURE 3 analog to digital mode of the system, a suitable multi-trace seismic record, including time break information and a reference timing signal, is placed upon the analog transport 60 for analog playback. The plural channels of analog signals are present on leads 62 to respective input amplifiers in the bank 64; the plural channels of seismic information are present on output leads 74 to multiplexer 70, the zero time pulse is present on lead 68, and the reference timing signal is present on lead 66 back to the phase comparator 136 in the transport speed control 61. Assume now for purposes of this operational description that the sampling rate selector switch 150 is set for 2 millisecond sampling, that is, a sample is taken of each of the plural input channels of seismic information at a point which is equivalent to 2 millisecond intervals of field time.

This is effected by running the analog transport 60 at twice the speed at which the record medium was field recorded, i.e. at a playback of 7.2 inches per second of a field record which was recorded at 3.6 inches per second. Thus, selection of the 6 kc. signal from lead 142 by selector switch 150 enables a 750 cycle signal on lead 160 to the velocity comparator 134 and a 200 cycle phase lock signal on lead 166 to the phase comparator 136. The D-C synchronous drive 122 will then tend to drive at a speed consonant with the null outputs on leads 168 and 170 from the phase comparator 136 and velocity comparator 134. Thus, when the D-C synchronous drive 122 is at its correct driving speed, moving the analog transport 60 at 7.2 inches per second, the divided output from encoder 126 on lead 132 will come to 750 cycles per second and the played back reference timing signal on lead 66 from the bank of input amplifiers 64 will come to 200 cycles per second. However, any variation in the field recording speed, which would cause a variation in the reference timing signal, or any additional variation in the speed of analog transport 60, which may cause further variation in the frequency of the reference timing signal played back on lead 66, will cause proportional change in the analog transport speed so that the data input to the multiplexer 70 will always be in the real or true field time relationship.

With the analog transport 60 moving at the correct speed, thereby ensuring the correct sampling rate, the zero time pulse on lead 68 enables the multiplexer 70 and the analog to digital converter 72 such that the plural channels of seismic information fed in on leads 74 are sequentially scanned at the selected sampling rate and provided as a time sequential output analog voltage on lead 76 to the analog to digital converter 72. The plurality of input channels (assuming a twelve channel system) are each scanned one time, in sequence, within the 1 kc. rate with individual channel scan taking place at the 12 kc. rate, the channel switching frequency. The analog to digital converter 72 provides a coded (e.g. binary) digital output for each data value on lead 98 to the data value storage 100, and the individual digital data values are applied through digital write circuits 104 for recording on digital tape transport 108 at the rate of the 24 kc. clocking signal on lead 110 from the divider 82. The format control 112 selects the desired recording sequence, which, as disclosed herein, is the five and six bit parallel characters sequentially placed to form a data value or word on the computer-compatible tape. Odd bit lateral parity is inserted in conventional manner; and, at the end of a digital file, the total number of values derived from a seismic record, longitudinal parity is inserted prior to the end of file gap.

It has been found that saturation-type digital recording works to good advantage in the system but this need not be a strict limitation. The digital file employs no recorded time values, the real time of the individual data values existing through their placement in the digital data file relative to the zero reference point or point coincident with the beginning of digital value recording for the particular seismic record. The digital tape transport may be any of various commercially available units which provide, preferably, read and write, photosense, file protect, fast rewind, etc.

Figure 4:
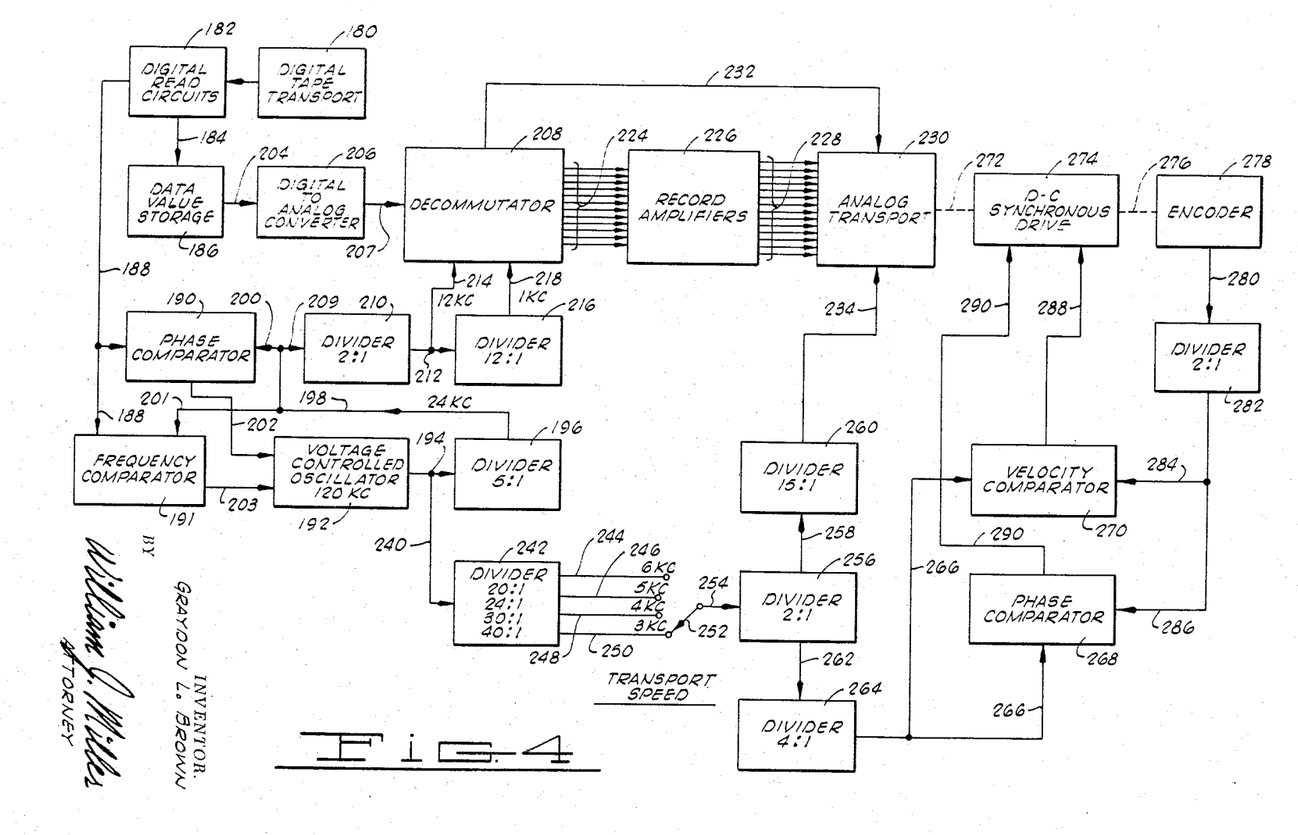
FIG. 4 is a system block diagram for performing the digital to analog processing phase of the present method.

FIG. 4 illustrates the alternative phase of the method or the diigtal to analog conversion mode. This is an exemplary form of system for carrying out the method utilizing a computer-compatible digital tape input to thereafter reconstitute the plural channel analog seismic information.

A digital storage tape containing seismic information is applied to a digital tape transport 180 and the binary coded digital signals are transduced in digital read circuits 182 and applied on line 184 to a data value storage stage 186. The digital tape transport 180 may be a unit similar to the digital tape transport 108 of FIG. 3 or it may be the same unit. During the playback phase of operation, the digital tape transport 180 would be operated at the same speed at which the digital tape was recorded, i.e. 43.165 i.p.s. for twelve channel operation. However, due to the fact that digital tape transports generally have a poor speed accuracy and cannot be relied upon for an accurate time base, synchronous playback is achieved by the use of character count and subsequent proportional clocking variations as will be described below.

A character count output from the digital read circuits 182 is present on a lead 188 for application to a phase comparator 190 and a frequency comparator 191. The count frequency may be selected in accordance with the particular equipment and, in this example, it is selected to be a nominal 24 kc., nominal in that it will vary in frequency in proportion to speed variations of the digital tape tape transport 180 from the desired speed. A voltage controlled oscillator 192, having a nominal frequency of 120 kc. is employed as a basic timing source. The voltage controlled oscillator 192 provides an output 194 to a 5:1 frequency divider 196 thus providing an output on line 198 of a nominal 24 kc. for application to input 200 to the phase comparator 190 and input 201 to frequency comparator 191. The phase comparator 190 and frequency comparator 191 may be circuits similar to the comparators 134 and 136 of FIG. 3. Thus, the phase comparator 190 compares the character count input on lead 188 (of about 24 kc.) with the input 200 from frequency divider 196 to provide an output D-C control voltage on a lead 202 for fine control of the voltage controlled oscillator 192 such that it will generate an output signal having a frequency varying in proportion to changes in the speed of digital transport 180. Similar coarse control is exerted by the input 203 from frequency (or velocity) comparator 191.

The sequential binary code characters are conducted from data value storage 186 on a lead 204 to a digital to analog converter 206 and a time sequential analog output is provided on lead 207 to a decommutator 208. The conversion timing is controlled at a rate derived from the nominal 24 kc. signal on lead 198 through an input 209 to the 2:1 frequency divider 210. The frequency divided output on lead 212 of about 12 kc. is applied on a lead 214 as the channel switching frequency to the decommutator 208. Lead 212 also connects the signal to a further 12:1 frequency divider 216 which provides a nominal 1 kc. output on lead 218 to the decommutator 208 as the scan control signal. Thus, it is apparent that any variation in the character count on lead 188 will cause a proportional variation in the frequency output of voltage controlled oscillator 192 and, therefore, the nominal frequencies derived for channel switching and scan control of the decommutator 208 will be similarly varied to maintain proper data value time relationships in the decommutation and subsequent stages.

The decommutator 208 provides plural outputs 224, each containing the analog seismic information for a single trace or channel, for application to a bank of record amplifiers 226. After amplification the individual analog signals are each applied on leads 228 for recording on the analog transport 230. The amplifiers 226 are optional depending upon selection of recording equipment. A start pulse, equivalent to a zero time pulse is derived from the digital to analog converter 206, via decommutator 208, for application on lead 232 and recording on the seismic record of analog transport 230. Similarly, a reference timing signal may be applied to the recording of analog transport 230 on a lead 234 as will be described below.

Analog transport 230 is accurately controlled to track system timing variations which show up in the frequency variations of the output 194 from voltage controlled oscillator 192. The analog transport speed control is much the same as that of FIG. 3 as will become more apparent from the following. The output from voltage controlled oscillator 192 on lead 194 is applied on a lead 240 to a plural ratio frequency divider 242. The divider 242 (in this exemplary showing) divides at ratios of 20:1, 24:1, 30:1 and 40:1 providing plural outputs on leads 244, 246, 248 and 250 for selection by a selector switch 252. The respective outputs on leads 244–250 will be 6 kilocycles, 5 kc., 4 kc. and 3 kc. nominally. Selector switch 252 serves to select the speed at which the analog transport 230 travels.

The selected signal from switch 252 is then applied on input lead 254 to a 2:1 frequency divider 256; whereupon the divided signal is applied on lead 258 to a 15:1 frequency divider 260 and also on a lead 262 to a 4:1 divider 264. The divider 260 provides reference timing pulses on lead 234 for recording on the seismic record at analog transport 230. For example, these timing pulses would occur each 10 milliseconds (100 c.p.s.) for the case where the 3.6 inches per second velocity is selected for analog transport 230.

The frequency divider 264 provides a frequency or velocity reference for application on a lead 266 to each of a phase comparator 268 and a velocity comparator 270. The analog transport 230 is driven by a shaft 272 providing rotational drive from a D-C synchronous drive 274. This rotational drive is also transmitted on a shaft 276 to an encoder 278 to provide an output on a lead 280, the frequency of which is a direct indication of the rotational velocity. In the case here illustrated, the encoder 278 may be a 5,000 count photo-electric disc encoder; hence, a 2:1 frequency divider 282 is included in the output to provide the proper reference frequency on leads 284 and 286 to the respective velocity comparator 270 and phase comparator 268.

The velocity comparator 270 accepts the input on lead 284 from the frequency divider 282 and the reference signal on lead 266, to provide a control voltage output on a lead 288 to the D-C synchronous drive 274. Similarly, the phase comparator 268 accepts the same two input signals (leads 286 and 266) and provides a D-C control voltage output on lead 290 to the D-C synchronous drive 274. Thus, the velocity comparator 270 serves to correct for large errors, as when the analog transport is first started and is coming up to the proper frequency or velocity, and the phase comparator 268 may then take over to correct for smaller errors which show up as phase differences between two similar frequencies.

The operation of the system of FIG. 4 provides recovery of stored digital information representative of plural channel seismic information in analog form and in the proper real time relationship with respect to the beginning or start time of the analog information. A digital tape, in a format such as shown in FIG. 2, is selected for information retrieval and positioned for playback on the digital tape transport 180. Upon starting the digital tape transport 180, the stored digital information is read out by the digital read circuits 182 and presented for acceptance to the data value storage 186. The digital read out provides binary code voltage indications of five and six bit characters in succession and the data value storage 186 accepts the serial characters to provide a binary output for each data value on lead 204 to the digital to analog converter 206. The digital read circuits 182 also generate a character count output on lead 188 for application to phase comparator 190 and frequency comparator 191 thereby controlling the voltage controlled oscillator 192 which provides the system timing.

The voltage controlled oscillator 192 is carried about a normal frequency selected at 120 kc., variations being proportional to any variations in the character count on lead 188. The output from voltage controlled oscillator 192 is divided down in frequency dividers 196, 210 and 216 to derive suitable channel switching and scan frequency signals for control of the decommutator 208. Thus, as the digital to analog converter 206 provides a time sequential output on lead 207, the decommutator 208 separates each of the sequential analog data values into its proper channel for output on one of the plurality of leads 224. In the present case of a twelve channel system, the 12 kc., channel switching signal is provided on lead 214 and a further divided 1 kc. signal is applied on lead 218 for scan control of decommutator 208. That is, successive analog samples are ordered and assigned to their proper channel positions at the 12 kc. or channel switching rate and the 1 kc. or scan rate controls the recycling of sample assignment after one sample from each successive channel has been read.

Since the channel switching frequency and the scan frequency (12 kc. and 1 kc., respectively) will vary about a nominal value in response to variations in voltage controlled oscillator 192 and the character count from digital read circuits 182, the decommutation will take place at a rate which tracks accurately with any variations of binary data input from the digital tape transport 180 and digital read circuit 182. The decommutator 205 provides a pulse output on a lead 232 upon initiation of operation for application to the analog transport 230 as a zero time or start pulse. The individual channels of analog seismic signals present on leads 224 may then be amplified in a record amplifier bank 226 (optional) and thereafter applied for recording on the analog transport 230.

The speed of analog transport 230 is also varied in response to digital read out by means of the synchronous drive 274 regulated from the basic, variable frequency source, the voltage controlled oscillator 192. The output from oscillator 192 is divided down through frequency dividers 242, 256 and 264 to provide a frequency or velocity reference for comparison in the velocity comparator 270. The velocity comparator 270 accepts the velocity reference signal on lead 266 and a signal on lead 284 from the encoder 278, which has a frequency indicative of actual analog transport speed at a given instant, to derive a D-C control voltage for controlling the D-C synchronous drive 274. The phase comparator 268 may utilize the similar voltage inputs to derive an output having voltage and polarity indicative of phase difference to provide further control of the D-C synchronous drive 274. As previously stated, the velocity comparator 270 performs to correct for large errors and thereafter the phase comparator 268 can correct for the more minute speed variations.

The analog transport 230 is therefore controlled to follow accurately at a speed as determined by the voltage controlled oscillator 192. The transport speed selector switch 252 may be operated to provide a transport speed (analog transport 230), of 3.6 inches per second, 4.8 i.p.s., 6 i.p.s. or 7.2 i.p.s. by making the proper frequency selection. The output from divider 256 may also be applied through a further 15:1 frequency divider 260 to provide an output on lead 234 for application to the analog transport 230 as a reference timing signal. Thus, at the more or less standard transport speed of 3.6 i.p.s., a 100 cycle signal may be recorded with proportionally higher reference timing signals being available for each of the faster analog transport speeds.

As was previously stated with respect to the operation of the analog to digital mode of FIG. 3, a seismic field record recorded at 3.6 i.p.s. can be played back on the analog transport 60 at either 3.6 inches per second, 4.8 i.p.s., 6 i.p.s. or 7.2 i.p.s., depending upon the type of seismic information and the required packing density of the final digital storage member. In similar but reversed manner, the FIG. 4 digital to analog mode retrieves the digital information from digital storage and depending upon the packing density of that particular digital record, the analog transport 230 can be controlled to operate at the proper speed for recording the plural channels of seismic information in their real time relationship. In some cases it may be desirable to record the recovered analog information in other than a real time relationship; in any event, the time relationship or speed ratio will be known and accounted for in the final analog record.

Figure 5:
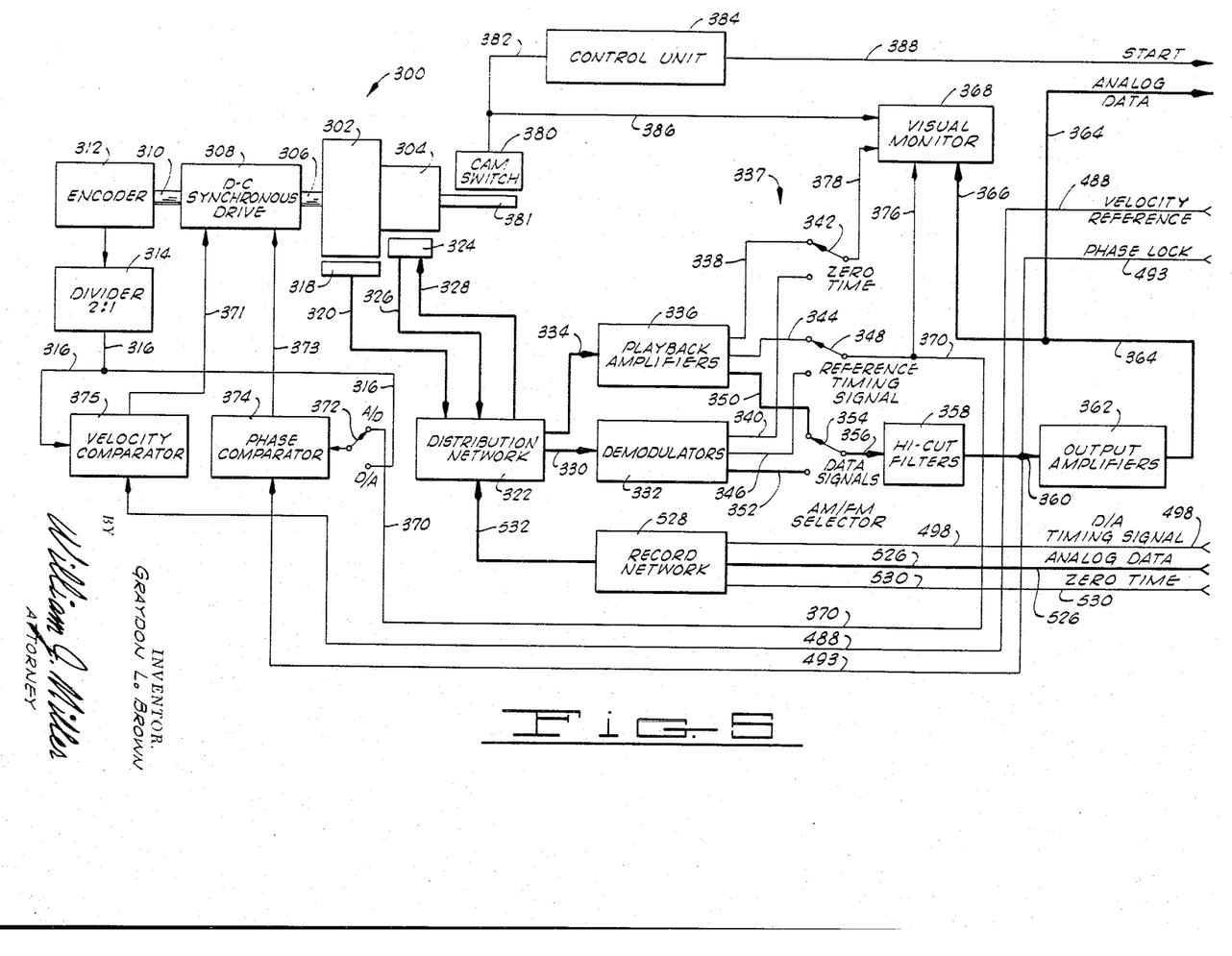
FIG. 5 is an analog signal input portion of an integral signal processing system.
Figure 6:
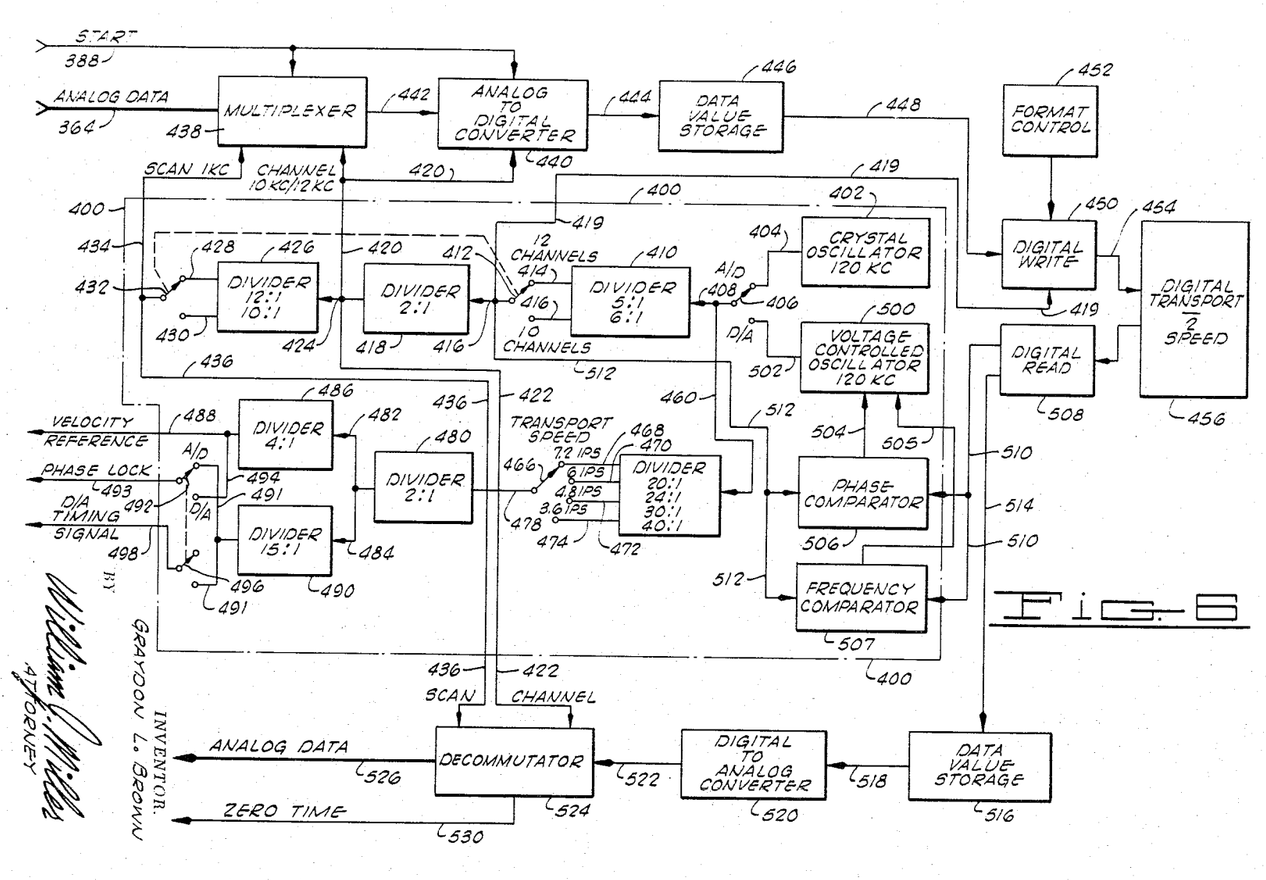
FIG. 6 is the timing and digitalizaton portion of an integral signal processing system.

FIGS. 5 and 6 illustrate one form of system which may be utilized for carrying out the present method. FIG. 5 is primarily the input system for processing analog seismic signals for acceptance by the digital processing equipment of FIG. 6. The system provides operation in both the analog to digital mode and the digital to analog mode at a plurality of analog transport speeds and with provision for multiplex and digitalization of either ten or twelve channels of input information. The inclusion of alternatives for either ten or twelve channels of input is set forth here because these are multiples which are often employed in the geophysical prospecting art; however, more or less channels may be provided for in the system as a matter of design choice. Similarly, the analog transport speeds of 3.6 inches per second, 4.8 i.p.s, 6 i.p.s. and 7.2 i.p.s. are merely a matter of choice dictated by widely accepted practices in the art.

Referring first to FIG. 5, an analog transport 300 consists of two different drum-type recording surfaces 302 and 304, both of which are often employed in the related art. The wide diameter drum 302 is what is termed the SIE type AM/FM recorder drum (Southwestern Industrial Electronics Corporation, Houston, Tex.). The narrower cylinder or drum 304 is known as a Techno AM recorder drum as supplied by Techno Instrument Corporation. Both drums are supplied with the analog transport 300 since both types or records are commonly employed in field recording of seismic information. Recorder drums 302 and 304 receive rotational drive via a shaft 306 from a D-C synchronous drive system 308, and the same rotational drive is transmitted through a linkage 310 to an encoder 312, preferably of the aforementioned photo-electric disc indicator type. An exemplary form of encoder 312 would provide 5000 pulses per revolution and, hence, its output can be conducted through a 2:1 frequency divider 314 to provide the proper velocity or frequency indications on a lead 316 for controlling the D-C synchronous drive 308 and, thus, the analog transport 300 as will be further described.

Each of the recorder drums 302 and 304 has 28 magnetic record tracks. A first set of 28 recorder heads 318 are aligned for pick up from the 28 tracks of the SIE type drum 302. These plural outputs are each conducted through a cable 320 to a distribution network 322. A second set of magnetic transducer heads 324 are aligned with each of the 28 tracks of the Techno-type drum 304 for either pick up or recording thereon. Thus, in the pick up or read out phase of operation, the heads 324 conduct the parallel signals through a cable 326 to distribution network 322 and, during a recording operation (as will be further described), plural signal channels can be conducted from distribution network 322 through cable 328 to the respective 28 recorder heads 324.

The distribution network 322 may be a suitable patchboard or other well-known channel switching circuitry for routing the various channels of analog information as well as their attendant zero time pulses and reference timing signals. Since recorder drums 302 and 304 make provision for twenty-eight channels, an actual field record might be made up of two parallel sections of that shown in FIG. 1. That is, two pairs of twelve analog seismic data channels or traces and a zero time channel and a reference timing signal channel with each of the pairs. The two pairs of fourteen channels would each represent a separate seismic shot such that signal processing through a fourteen channel processing system as set forth here (FIG. 6) would be carried out by sequential handling of each of the fourteen channel pairs. Thus, it may be desirable to include in distribution networks 322 a relay system which the operator can actuate to switch between the fourteen channel pairs of leads which are present in each of cables 320, 326 and 328.

In the analog to digital mode of operation there are two fourteen channel cables leading out from the distribution network 322. In the event of FM playback, as would be present on lead 320 from the SIE drum 302, a cable 330 applies each of the twelve data signals, the reference timing signal and the zero time signal to a demodulator 332 of well known type. In the event of AM playback, a similar cable 334 makes the same connection to a bank of playback amplifiers 336. Playback amplifiers 336 would consist of fourteen conventional amplifiers for processing each of the input signals. The outputs from playback amplifiers 336 and the demodulators 332 are applied in parallel to an AM/FM selector switch 337. That is, zero time signals available on leads 338 and 340 can be selected by a zero time switch 342. Similarly, reference timing signals on leads 344 and 346 are connected through a switch 348, and the plurality of data signal leads 350 and 352 are selectable by the data signal switch 354. While switch 354 is shown as a single switch, it would, of course, be a tandem switch providing plural channel passage of the twelve data signals. Further, it is probable that design practice would dictate that all sections of the AM/FM selector switch 337 be comprised of a ganged switch.

The plural data signal inputs on cable 356 would be applied to separate ones of a bank of high-cut filters 358. The individual filter outputs present on leads 360 would each be applied to a separate one of a bank of output amplifiers 362. The high-cut filters 358, as well as the output amplifiers 362, are types of electronic circuitry which are well known in the seismic signal processing art. The plural channels of analog seismic data are then conducted from the output amplifiers 362 through the plural channel cable 364; whereupon they are available for input to the digitalization circuitry (FIG. 6). The plural channels of seismic information are also conducted through a cable 366 to a visual monitor 368, a multi-trace oscilloscope, to enable the operators' inspection or whatever.

The reference timing signal from switch 348 is conducted on a lead 370 where it is lead back to the analog transport speed control. That is, the lead 370 connects to a switch 372 which enables application of the reference timing signal to a phase comparator 374 during the analog to digital mode of operation. A velocity comparator 375 is also employed in the transport speed control and this will be further described below. The reference timing signal from switch 348 is also conducted on a lead 376 to the visual monitor 368.

The zero time pulse from the zero time switch 342 is conducted on a lead 378 to the visual monitor 368. This provides the operator with a more accurate means for starting the signal processing operation. An adjustable cam switch 380 may be positioned to be actuated by a shaft extension or other mechanism, shown as extension 381, at a certain rotational point in the revolution of the analog transport. This then provides a voltage indication on a lead 382 to the control unit 384, and a parallel voltage indication on a lead 386 to an input of the visual monitor 368. Thus, the operator can align the voltage indication from cam switch 380 and the zero time pulse from switch 342 to derive the optimum starting point prior to each signal processing run. This is especially desirable due to the fact that a recorded time break or zero time pulse, as played back from the field record, is very often irregular and inconsistent and not properly usable as a control pulse. Thus, after the operator has obtained a good alignment or zero time synchronization between the analog transport 300 and the zero time pulse occurrence (lead 378), he may then manually actuate the control unit 384 to initiate a start pulse which is present on a lead 388 for application to the digitalization equipment (FIG. 6).

The timing for the entire system is derived from a timing unit 400, shown enclosed by a dash line in FIG. 6. This timing unit provides timing signals of proper frequency to control the speed of the analog transport 300 (FIG. 5) as will be further described. The timing unit 400 also provides the proper channel switching and scan frequencies for controlling the multiplex operations and the analog-digital-analog conversion circuitry for either ten or twelve channel processing alignments.

Referring first to the analog to digital mode, a precision crystal oscillator 402 is provided as the basic signal source within the timing unit 400. The crystal oscillator 402 is designated here as a 120 kc. oscillator, however, other basic frequencies may be employed, the suitable frequency dividing and switching circuitry being a matter of design choice. The basic output signal from crystal oscillator 402 is present on a lead 404 to a switch 406 which selects between analog/digital and digital/analog operation as will be further described. The output from switch 406 is then applied on a lead 408 to a plural-ratio frequency divider 410. The frequency divider 410 provides a pair of outputs to a switch 412 which serves to select the channel switching frequency. Thus, the frequency divider 410 divides at a ratio of 5:1 to provide a 24 kc. output signal on lead 414 for twelve channel operation and it divides at a ratio of 6:1 to provide a 20 kc. output on lead 416 for ten channel operation. The channel switch 412, here shown in the twelve channel position, then conducts the proper signal on a lead 416 to a further 2:1 frequency divider 418. Also, the signal on lead 416, either 20 kc. or 24 kc., is conducted on lead 419 for digital write control as will be further described.

The output from divider 418 is then applied on a lead 420 as the channel switching frequency in the analog to digital operation. Another output on a lead 422 provides a channel switching frequency for the digital to analog mode of operation as will be further described. Further, the output from frequency divider 418 is applied on a lead 424 to a further plural-ratio frequency divider 426. The frequency divider 426 provides a pair of outputs on leads 428 and 430 which are further divided at respective ratios of 12:1 and 10:1. Thus, the switch 432 selects the proper scan frequency signal for application on leads 434 and 436 to the respective analog to digital and digital to analog modes of the system. The switch 432 may be ganged for simultaneous operation with channel switch 412, and the divider 426 and switch 432 merely serve to insure a 1 kc scan signal when either the ten or twelve channel switching frequency is selected.

The leads 420 and 434 apply channel and scan frequency signals to the multiplexer 438 during the analog to digital operation. Plural channels of input analog information are provided on the analog data cable 364 from the output amplifiers 362 (FIG. 5). A start signal as derived from the control unit 384 (FIG. 5) is present on lead 388 for input to the multiplexer 438 as well as the analog to digital converter 440. With the initiation of multiplexing, by application of start signal 388 to the multiplexer 438 and analog to digital converter 440, the plural channels of input seismic information are each scanned once sequentially with each scan frequency pulse on line 434. The sequence switching or channel switching is accomplished in the interim scan periods by the channel switching frequency applied on lead 420. Thus, for either the ten or twelve channel scan it can be noted that the channel switching frequency is a ten or twelve times multiple of the scan frequency.

The sequential time samples from multiplexer 438 are then present on a lead 422 to be accepted by the analog to digital converter 440. The converter 440 is also actuated by the start pulse 388 and controlled at the channel switching frequency (lead 420) to make the digital conversion of each sequential analog input signal. Thus, the digital equivalent signal outputs are present on a lead 444 for intermediate storage in a conventional 12 bit data value storage 446. The multiplexer 438 may be one of various types well known in the art and the analog to digital converter 440 may also be a well known type, care being taken to assure compatibility with the previous multiplexer stage. Also, as previously stated, the data value of the storage 446 may be any of several types of conventional intermediate storage facility. It is required only that it accept a 12 bit binary value for each analog sample to thereafter provide an output for retrieval in proper character sequence.

The output from data value storage 446 is then applied on a lead 448 to the digital write circuits 450. The digital write circuits 450 are under the control of the digital write timing signals on lead 419 and the format control 452 in order to provide the proper write sequencing for energization on a lead 454 to a suitable digital recording medium (not shown) carried by the digital transport 456. The digital transport 456 is indicated as being a two speed transport, alternatively energized by any suitable well-known drive system. The digital transport 456 should be able to provide a first transport speed of 35.971 inches per second for ten channel operation and a second speed of 43.165 inches per second for twelve channel operation. It should be understood, however, that the selected speeds are consonant with the exemplary frequency of operation of the timing system and can be varied in accordance with design requirements.

Still referring to the analog to digital mode of operation, it should be restated that the timing unit 400 must also provide both a phase lock and a velocity reference signal for application back to the transport 300 (FIG. 5) for speed control purposes. Thus, a lead 460 from the analog-digital analog mode switch 406 at the output of crystal oscillator 402, provides the 120 kc. signal to a plural-ratio frequency divider 462. The frequency divider 462 provides a plurality of different frequency outputs for selection by the transport speed switch 466. Thus, frequency divider 462 provides a 20:1 division output of 6 kc. on lead 468, a 24:1 division output of 5 kc. on lead 470, a 30:1 division output of 4 kc. on lead 472, and a 40:1 divided output of 3 kc. on lead 474. These frequencies of 6 kc., 5 kc., 4 kc. and 3 kc. are then selectable through transport speed switch 466 to provide respective transport speeds of 7.2 inches per second, 6 i.p.s., 4.8 i.p.c., and 3.6 i.p.s. as indicated.

The selected output from switch 466 is then applied on lead 478 to a further 2:1 frequency divider 480 which provides its output on leads 482 and 484 for still further division. The output on lead 482 is divided 4:1 in frequency divider 486 to provide a velocity reference output on lead 488 for transmission to the velocity comparator 375 (FIG. 5). The velocity reference signal on lead 488 (for the exemplary frequencies here set forth) would have a frequency of 750 cycles, 625 cycles, 500 cycles or 375 cycles for the respective transport speed settings of the switch 466. Also, these transport speeds are indicative of, or equivalent to, a specific sampling rate when it is considered that the scan rate and channel switching frequency remain the same for all transport speeds. The frequency, transport speed and sampling rate equivalencies would be the same as previously stated with regard to FIG. 3.

The output from the 2:1 divider is also applied on lead 484 to the 15:1 divider 490 which provides a phase lock output on lead 491 for transmission through an analog/digital setting of a switch 492 and lead 493 to the phase comparator 374 (FIG. 5). The phase lock signal on lead 493 will have frequencies of 200 cycles, 167 cycles, 133 cycles for the respective settings of transport speed switch 466. In digital/analog mode, to be further described, a different reference signal is applied to the phase lock lead 493. The velocity reference signal from lead 488 is paralleled via lead 494 through switch section 492 and lead 493 to the phase comparator 374. Also, the previous phase lock signal on lead 491 is applied to a switch section 496 which provides a digital to analog timing signal on lead 498 (when the operating mode is digital to analog).

When the signal processing system (FIGS. 5 and 6) is operated in digital to analog mode, the switch 406 within the timing unit 400 is switched to the digital/analog position (opposite from shown) and the basic timing a nominal frequency of 120 kc. as provided on lead 502. source becomes a voltage controlled oscillator 500 having a nominal frequency of 120 kc. as provided on lead 502. The operation of the various divider stages of the timing unit 400 remains the same; however, instead of the precise input frequency of crystal oscillator 402 there is a frequency which varies about a nominal value of 120 kc. in response to control input on leads 504 and 505 from a phase comparator 506 and frequency comparator 507. The phase comparator 506 and frequency comparator 507 each compare an input voltage in the form of a character count of about 24 kc. on lead 510 from the digital read circuits 508 and a second signal input which consists of the ten or twelve channel divided output on lead 512 from frequency divider 410 and channel switch 412. Thus, both comparators 506 and 507 will receive an input of either 20 or 24 kc. (ten or twelve channels) on lead 512 and a character count input of either 20 or 24 kc. (depending upon the digital transport speed) on lead 510 to derive control voltages on leads 504 and 505 which will vary the output frequency of voltage controlled oscillator 500 in accordance with variations detected by the comparators 506 and 507. The comparators 506 and 507 are conventional stages which derive coarse and fine D-C error voltages having amplitude and polarity representative of phase difference and direction. Similarly, the voltage controlled oscillator 500 is a well-known type of circuit and is often employed in conjunction with a phase comparator control source as shown.

In the digital to analog mode, the digital transport 456 is started and run at its selected speed to provide retrieval of the stored digital information through digital read circuits 508 as binary coded, 12 bit digital information on a lead 514 to the data value storage 516. The data value storage 516 then provides retrieval from intermediate storage on a lead 518 to a digital to analog converter 520 wherein the successive data characters are converted to an analog value to provide a time sequential analog voltage output on a lead 522. The time sequential analog values are then conducted through a decommutator 524; whereupon plural channels of analog seismic data are present in parallel leads of a cable 526 for conduction back to a record network 528 (FIG. 5).

The handling of time sequential analog information in decommutator 524 is under the control of scan and channel switching signals as applied on leads 436 and 422 from respective frequency dividers 426 and 418 in the timing unit 400. Thus, channel switching frequencies of either 10 or 12 kc., depending upon the selected channel handling capacity, and a scan frequency of 1 kc. will be employed to control demultiplexing; the decommutator 524 being operated at the same rates as prevailed in the multiplexing operation and thus insuring accurate reconstitution of the individual seismic analog signals on cable 526. The decommutator 524 also provides an output on a lead 530 which signifies the start of decommutation operation. This may be a simple flip-flop indication with reset only upon completion of a decommutation sequence of a complete record. Other well-known forms of circuitry may be employed, the importance being to provide a zero time pulse on lead 530 back to the record network 528 for parallel recording with the analog information.

Referring again to FIG. 5, the record network 528 receives inputs consisting of the digital to analog timing signal 498, the analog data 526, and the zero time indication on a lead 530, whereupon the plural channel information may be further processed or prepared for recording. The information is then transmitted on a cable 532 for application in the distribution network 322 whereupon, by proper relay control or patchboard manipulation, it is conducted on cable 328 to the selected transducer heads 324 for recording on the Techno-type analog transport drum 304. As previously stated, there are twenty-eight transducers in the transducer head array 324, however, suitable relay switching assemblies within the distribution network 322 will assure that fourteen selected transducer heads are connected to receive input from the cable 328 for recording.

In the operation of the integral system of FIGS. 5 and 6, it is possible to select a particular analog seismic record, such as that shown in FIG. 1, and process it for storage on digital tape as shown in FIG. 2. An entire digital tape reel may contain binary coded digital equivalent records of as many as 200 analog tapes, i.e. multiple-trace seismic records with field recorded reference timing signal and time break indication. The stored digital information may then be placed in long term storage, transmitted for additional processing or interpretation, or played back for retrieval and reconstruction of the analog information.

A selected analog seismic record as brought in from the field is first placed on one of the recording drums 302 or 304 for playback. The operator can then set the selected fourteen channels or traces are properly routed to either the playback amplifiers 336 or the demodulators 332, depending upon whether an FM or AM playback is being effected. The AM/FM switch 337 would be set accordingly and the system would be in readiness for zero time alignment procedure.

For zero time alignment, the operator utilizes the visual monitor 368 to obtain a dual trace indication of the zero time pulse (as field recorded), present on lead 378 from the AM/FM switch 337, and an indication of the analog transport 300 rotational position as derived from cam switch 380 on lead 386. Thus, prior to enabling of the analog/digital processing circuitry the operator can assure an optimum alignment to derive a best starting point for processing. That is, either by mechanical adjustment of cam switch 380 or by suitable pre-positioning of the D–C synchronous drive 308 and, therefore, the analog transport 300, the proper starting point is set into the system. Upon attaining this alignment the operator can actuate the control unit 384 to provide a system start output on lead 388.

It should be noted that during the pre-positioning procedure the crystal oscillator 402 is energized and proper analog to digital outputs are provided from the timing unit 400 (FIG. 6). That is, a velocity reference voltage on lead 488 and a phase lock voltage on lead 493 are conducted to the velocity comparator 375 and the phase comparator 374, respectively, to drive the analog transport 300 at a proper, controlled rotational speed. Even during the pre-positioning period, the field recorded reference timing signal, as derived from switch 348 of the AM/FM switch 337, is conducted on lead 370 back to the switch 372 (in analog/digital setting) for application to the phase comparator 374. Similarly, a signal indication is derived from the photoelectric encoder 312, divided in frequency divider 314 and applied on a lead 316 to the velocity comparator 375. The analog transport 300 is then controlled to vary in rotational speed with any variations in the field recorded reference timing signal. This servo function will rapidly come to a closely following attitude such that the output reference timing signal (as played back) will be maintained at its true or intended frequency of 100 cycles per second and all channels of data signals and zero time will remain in the same proper or field time relationship for input into the analog to digital processing circuitry.

Switch section 354 of the AM/FM switch 337 selects the plural channels of data signals for application through suitable high-cut filters 358 and output amplifiers 362 for input on cable 364 as the analog data input for further conversion and processing. The plural channels of analog data are also conducted on a cable 366 to separate traces of the visual monitor 368 for operator inspection and, by means of lead 376 from the reference timing signal lead 370, the operator can also inspect the field recorded timing signal.

To reiterate, no matter what transport variations may have occurred in the field or in analog transport 300, the reference timing signal is employed to vary the speed of analog transport 300 such that reproduced analog signal data present on lead 364 to the multiplexer 438 appears at actual or true field time. That is, any speed variations which may have occurred in the field recording or playback on the analog transport 300 are removed by speed changes effected in response to variations of the reference timing signal which originated in the field as a known frequency (in this case 100 cycles per second).

Since it is assured that the analog data on lead 364 is applied to multiplexer 438 in true field time, the sampling rate of multiplexer 438 can be varied by selecting different ones of a plurality of basic transport speeds. Thus, in timing unit 400, the transport speed switch 466 can be actuated to select transport speeds of 3.6 i.p.s., 4.8 i.p.s., 6 i.p.s. and 7.2 i.p.s. The selector switch 466 will provide respective phase lock signals on lead 493 having frequencies of 100, 133, 167 and 200 cycles per second for phase comparison in the phase comparator 374. Thus, in order for the 100 cycles per second (as originally recorded at 3.6 i.p.s.) reference timing signal from AM/FM switch 337 on lead 370 to compare properly, the analog transport 300 will have to speed up accordingly and thus seek and lock in at the proper transport speed. Further, since the multiplexer 438 is controlled at a scan rate of 1 kc. applied on lead 434, the respective transport speeds of 3.6, 4.8, 6 and 7.2 inches per second will effect actual time sampling rates of the analog data at 1 millisecond, 1.33 ms., 1.67 ms. and 2 ms. intervals.

The multiplexing of input analog data on cable 364 is performed at a scan rate of 1 kc. and a channel switching rate of 12 kc. That is, a signal to scan all channels sequentially is provided by the scan frequency on lead 434 while individual channel sampling is effected by the channel switching signal on lead 420. The channel switching frequency can be varied as between 10 and 12 kc. to process either ten or twelve channel information as set by the channel switches 412 and 432. Time sequential analog information at the output of multiplexer 438 is applied on lead 442 to the input of the analog to digital converter 440. The converter 440 provides sequential, binary coded digital output of each discrete analog sample on lead 444 where it is applied into intermediate storage in the data value storage 446. The stored digital information can then be read out on lead 448 and applied to digital write circuits 450 under the direction of format control 452 as timed by the signal on lead 419 from timing unit 400 to record the binary coded digital information at digital transport 456. The digital transport 456 can be driven at 43.165 inches per second for processing twelve channel seismic information and it can be driven at 35.971 inches per second when processing ten channel seismic information. Hence, for processing either ten or twelve channels of input seismic information, the packing density of the resulting digital file (FIG. 2) will be the same to thus allow standardization of digital file length.

As shown in FIG. 2, the digital tape record pertaining to a single analog seismic tape (plural channel) consists of an identification file or header 42 followed by inter record gap 44 and the digital file 46. The identification word 42 may be employed for storing seismic tape identification and there is much addiitonal storage space wherein pertinent processing or operating instruction may be placed by suitable means.

Each discrete analog seismic sample or digital data value is recorded in two rows or characters of five and six bits each in well-known IBM type of format. The individual data values are placed sequentially along the data file 46, continuously and without any form of stored time indication, until the completion of the entire seismic record whereupon the end of file gap 52 is placed. It is preferable that both lateral and longitudinal parity insertions be made for each row and column of data file 46. It should be understood that still other tape formats of computer-compatible type may be employed in order to provide even greater resolution and accuracy, e.g. data file format providing data values of 16 bit length in two sequential characters is presently contemplated for some uses.

In the reversible operation or the digital to analog mode, the operator places the selected tape reel on the digital transport 456 and then rapidly scans the digital tape to find the desired identification word which denotes the data file or single analog tape which has been chosen for retrieval. It is preferable that the identification word, a six decimal digit identification number, be suitably displayed before the operator. The timing selector switch 406 is then actuated to the digital/analog position (opposite from that shown in FIG. 6) such that the timing unit 400 comes under the control of a basic, variable timing signal produced by the voltage controlled oscillator 500 having a nominal frequency of 120 kc. Thus, the timing unit 400 is operated at a variable rate about the 120 kc. frequency to adjust for any time variations in digital read out such that the digital to analog circuitry and the analog recording circuit will be operated at the real or true field time of the seismic signals.

The sequential data values of seismic information are read out from digital transport 456 by means of the digital read circuits 508 and conducted on lead 514 to the data value storage 516. The stored data values are then sequentially applied to the digital to analog converter 520 to provide a time sequential analog output on lead 522 to the decommutator 524. The scan and channel switching signals on leads 436 and 422, respectively, control the decommutation to reconstitute each channel of analog seismic information for conduction on the plural conductor cable 526 to the record network 528. A zero time indication is also derived from a first actuation of decommutator 524 to provide a zero time reference on lead 530 to the record network 528. Also, conducted in parallel to the record network 528 is the digital/analog timing signal on lead 498, derived from the timing unit 400 a manner to be described.

In digital to analog conversion the timing unit 400 is employed to synchronize both the decommutation of converted analog informaion and the selected rotational speed of the analog transport 300. This is effected by means of a character count output from digital read circuits 508 via lead 510 to the phase comparator 506 and frequency comparator 507. Thus, the voltage controlled oscillator 500 is continually controlled as to its output frequency by comparing both the phase and frequency of a frequency-divided input on lead 512 from the divider 410, either 20 or 24 kc. depending upon the channel selection, with the character count signal on lead 510. The comparators 506 and 507 derive D-C control voltages (coarse and fine error) for application on leads 504 and 505 to control the output frequency of the voltage controlled oscillator 500. Thus, the nominal 120 kc. output signal from voltage controlled oscillator 500 is divided down through divider 410 and the further frequency dividers 418 and 426 to provide scan and channel switching signal outputs on leads 436 and 422, respectively, to control the rate of actuation of the decommutator 524.

The rotational speed of transport 300 is controlled by the velocity reference signal and phase lock signal outputs on respective leads 488 and 493 from the timing unit 400. These control signals are derived from dividing down the output of the voltage controlled oscillator 500. This 120 kc. (nominal) output on lead 502 is conducted through the digital/analog switch 406 and via lead 460 to the frequency dividers 462 and 464; whereupon the transport speed selector switch 466 enables the selection of the desired frequency of signal. This signal is then further divided through the frequency dividers 480 and 486 to provide a velocity reference output on lead 488. When the analog/digital switch sections 492 and 496 are in the D/A positions, the lead 494 connects the output of frequency divider 486 to the phase lock lead 493. Hence, in digital to analog mode of operation the same signal is employed for both the velocity reference and the phase lock signals.

The output of frequency divider 490 on lead 491 is then conducted through switch section 496 as the digital/analog timing signal for application on lead 498 to the record network 528 and subsequent analog recording operations. This digital/analog timing signal will occur at frequencies of 100, 133, 167 and 200 cycles per second, depending upon the transport speed selection at switch 466, and will provide a reference timing signal for recording of the analog information which is similar to and has the same frequency relationships as a field recorded timing signal would have at the available transport speed settings.

The analog transport 300 is driven in synchronism with the voltage controlled oscillator 500 as per the velocity reference and phase lock control signals on leads 488 and 493. The leads 488 and 493 are applied to the velocity comparator 375 and the phase comparator 374 (FIG. 5) respectively. In the digital to analog mode, the switch 372 is placed in its opposite or D/A position such that the control frequency output from encoder 312, divided in frequency divider 314, is applied via lead 316 to both the velocity comparator 375 and the phase comparator 374. The respective D-C control voltages on leads 371 and 373 are then applied to provide coarse and fine control of the D-C synchronous drive 308 in a manner which has been previously described.

The operator will have previously adjusted the distribution network 322 to accept the zero time signal, the analog data, and the D/A timing signal as present in cable 532 to thereafter conduct the plural channels via cable 328 to a selected group of the transducer heads 324 to effect recording on the Techno type recording drum 304. The recording will be similar to that of FIG. 1, that is, there are 12 parallel channels of analog seismic information (or 10 channels if such is the case) and, parallel to and in real or field time synchronism therewith, there will be one channel containing the zero time reference and one channel containing a digital/analog timing signal, a nominal 100 cycle per second signal (at 3.6 i.p.s.).

It is contemplated that the operator will utilize the cam switch 380 in the digital to analog mode of operation in such the same manner as was previously described for the analog to digital mode. The cam switch indication may be suitably connected through the visual monitor 368 to afford an indication of synchronism between the rotational position of the analog transport 300 and the position of digital transport 456 prior to the beginning of read out, conversion and decommutation. Such control circuitry is well-known in the art and a matter of design choice.

Figure 7:
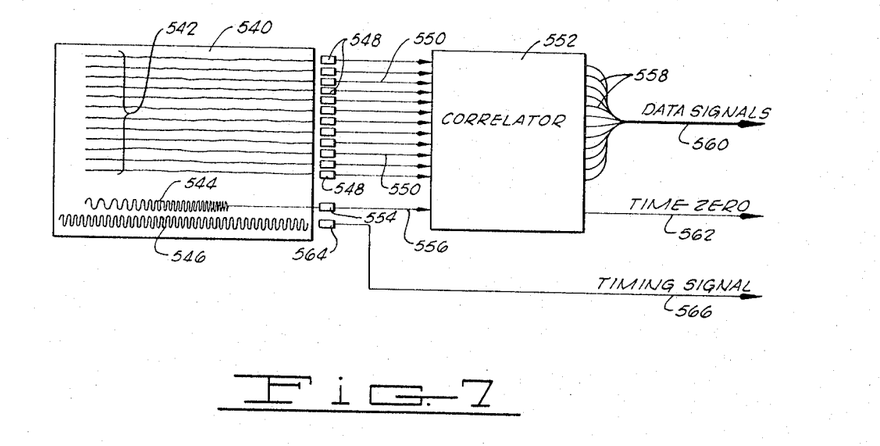
FIG. 7 is an adjunct apparatus which may be employed for preparing vibration-type seismic records for processing in accordance with the present invention.

FIG. 7 represents additional or attendant equipment which would be used in conjunction with the foregoing systems for adapting vibrational type field records for analog to digital processing and storage. A field record 540 shows the manner in which analog seismic information would be recorded in response to a vibrational geophysical sounding. That is, the type of sounding wherein a controlled frequency vibration of known duration is introduced into the earth and the return signals are detected and recorded for interpretative analysis. The multichannel seismic record or twelve channels 542 would be parallel recorded in known manner. In the place of the time break pulse, it's equivalent or a replica of the vibrational signal input to the earth is recorded. This shows up as the signal 544, what is known as a vibrational upsweep, having a continually changing frequency which progresses from lower to higher frequencies and has a known output duration. A constant frequency timing signal 546 would still be recorded in the same manner to provide a timing error reference.

A plurality of data read out heads 548 would be aligned wtih each of the data channels 542, each connecting its analog signal output on one of the parallel input leads 550 to a correlator 552. An additional head 554 is aligned for pick up of the vibration replica signal 544, which analog signal is also conducted by a lead 556 to the correlator 552. The correlator 552 operates on each of the parallel signal channels in known manner to provide correlated signal output on each of the leads 558 through the cable 560. Such a correlator and correlation procedure is the particular subject matter of U.S. Patent No. 2,989,726 entitled "Method of and Apparatus for Determining the Travel Time of a Vibratory Signal Between Spaced Points" in the name of Crawford et al. and assigned to the present assignee.

The correlated data signals on leads 558 would each have their repetitive signal reflection events (i.e. the vibratory nature of the signal) removed in favor of a time correlated signal pulse, the analog character of the voltages then being very much like explosive or single shot seismic record indications. The vibratory output signal 544 on lead 556 to correlator 552 would be correlated with a replica of its own configuration, thereby providing a single auto-correlation pulse, the time position of which occurs at actual time zero. This time zero pulse output on lead 562 from correlator 552 could then be applied as the zero time pulse in setting the time base of the processing system.

Still another transducing head 564 is aligned to pick up the reference signal channel 546 to provide an output on lead 566. This signal on lead 566 would constitute a timing signal, having a constant frequency (except for recording speed variations) and amplitude, which could be employed throughout the analog to digital to analog system in the same manner as was disclosed in the prior descriptions (FIGS. 3, 4, 5 and 6). Thus, the signal conductors 560, 562 and 566 might be applied to the distribution network 322 (FIG. 5) in the same manner as signal cables 320 and 326.

The foregoing method and apparatus provides equipment whereby multi-trace seismic records may be stored rapidly and in large quantity in digital format such that selected seismic record sections are readily accessible for retrieval and display, interpretative processing or whatever. The method employs a central timing source for synchronizing analog read out, multi-plexing, conversion to digital equivalents, and storage in computer-compatible digital format in a manner whereby the need for digital or other time reference incorporated within the intelligence of the digital record is obviated. The system as disclosed herein deals to a great extent with twelve channel geophysical processing applications, this being a multiple of channels which finds wide acceptance in the industry. However, it should be understood that the various plural channel signal handling equipments can be constructed to include any reasonable number of channels to fulfill the desired function. Further, these specific timing frequencies, transport speeds, sampling rates, etc. are not deemed to be a limiting factor since the choice of these values and multiples thereof are within the design criteria of such systems.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. A method of processing multi-trace seismic information which includes plural channels of seismic data and a reference timing channel which is recorded in the field as a predetermined frequency, comprising the steps of:
   deriving analog electrical signals from each channel of said seismic information;
   controlling the rate at which said analog signals are derived in response to frequency variations of said reference timing signal from said predetermined frequency, such that each of said analog seismic data signals is derived at its true field time;
   sampling said analog seismic data signals sequentially to produce a single time sequential analog signal and thereafter converting said time sequential analog signals to successive digital equivalents at a constant sampling and converting rate; and
   storing each of said successive digital equivalents at a constant storage rate such that each is spatially disposed for retrieval in its proper field time relationship with respect to the first stored digital equivalent.

2. A method of processing multi-trace seismic information as set forth in claim 1 which includes the step of:
   enabling said sampling and analog to digital converting steps at the zero time of said multi-trace seismic data.

3. A method of processing multi-trace seismic information as set forth in claim 2 which includes the further step of:
   deriving said zero time from a time break indication which is developed simultaneously with said plural channels of seismic data.

4. A method of processing multi-trace seismic information as set forth in claim 1 which is further characterized to include the steps of reversing the data conversion, comprising:
   retrieving said stored successive digital equivalents at a nominal rate in their storage sequence;
   converting said successive digital equivalents to respective analog voltage values to produce a time sequential analog signal;
   decommutating said time sequential analog signal to provide plural channels of analog seismic data signals;
   transducing said plural channels of analog seismic data signals to produce a multi-trace seismic representation; and
   controlling the rates of decommutation and transducing in proportion to any variation of said nominal rate of retrieval of the stored successive digital equivalents.

5. A method of processing multi-trace seismic information as set forth in claim 2 which includes the steps of:
   deriving a reference timing signal at a nominal rate varying in proportion to said nominal rate of retrieval and transducing said reference timing signal in parallel with said multi-trace seismic representation; and
   deriving a zero time signal coincident with the start of decommutation and transducing said zero time signal in parallel with said multi-trace seismic representation and reference timing signal.

6. A system for processing multi-trace seismic records which include plural channels of seismic data, a zero time channel, and a reference timing signal channel which is field recorded as a predetermined frequency, comprising:
   means for playing back said record to provide plural channels of seismic analog signals, a zero time pulse, and said reference timing signal;
   means for multiplexing said plurality of channels of seismic analog signals to form a single time sequential analog signal;
   means for converting said time sequential analog signal to successive digital equivalent voltage values;
   means for storing said successive digital equivalents in computer-compatible format;
   means generating an output signal at a constant frequency, basic timing rate;
   first means synchronized at said constant frequency timing rate and receiving said played back reference timing signal to vary the speed of said means for playing back to thereby continually maintain said reference timing signal at said predetermined frequency as field recorded;
   second means synchronized with said constant frequency timing rate for controlling said means for multiplexing and said means for converting such that sampling and analog to digital conversion take place at a constant rate; and
   third means synchronized at said constant frequency timing rate for controlling the storage of digital equivalent voltage values at a constant rate such that the real time of said multi-trace seismic record is retained through the spatial placement of the successive digital equivalents with respect to the first stored digital equivalent.

7. A system for processing multi-trace seismic records as set forth in claim 6 wherein said first means synchronized at said constant frequency timing rate comprises:
   synchronous drive means providing rotational drive to said means for playing back said record;
   first frequency divider means for receiving the output signal from said means generating an output signal at a constant frequency to provide an output phase lock signal at the predetermined frequency;
   phase comparator means receiving said reference timing signal at one input and said phase lock signal at a second input to provide an output D-C control voltage to said synchronous drive means to enable small corrections of speed variation;
   second frequency divider means receiving the output signal from said means generating an output signal at a constant frequency to provide a velocity reference signal output which is representative of the desired rotational drive speed;

encoder means connected to be rotationally driven at the same rate as said means for playing back said record and generating an output signal having a frequency indicative of rotational speed; and frequency comparator means receiving said velocity reference signal at one input and said encoder means output at a second input to produce a D-C voltage to control said synchronous drive means through large error correction variations.

8. A system for processing multi-trace seismic records as set forth in claim 6 wherein said second means synchronized with said basic timing signal comprises:

first frequency divider means receiving the output signal from said means generating an output signal at a constant frequency to provide a channel switching output signal to said means for multiplexing and said means for converting in order to control the channel sequencing of sampling and analog to digital conversion; and second frequency divider means receiving said channel switching output signal to provide an output signal at the multiplexing scan rate to said means for multiplexing to control the sampling interval.

9. A system for processing multi-trace seismic records as set forth in claim 8 wherein said first frequency divider comprises:

means for receiving said constant frequency output signal to provide an output signal at twice the channel switching frequency for controlling the storage of said digital equivalent voltage values at a constant rate such that the real time of said multi-trace seismic signals is retained through the spatial placement of the successive digital equivalents with respect to the first stored digital equivalent; and means for further dividing said output signal at twice the channel switching frequency to produce the channel switching output.

10. A system for processing multi-trace seismic records as set forth in claim 6 which is further characterized to include means providing retrieval of the stored digital information, comprising:

means for reading out said stored digital information to generate digital output voltage values at a read out rate which is nominally the same as said constant rate at which said digital equivalent voltage values were stored;

converter means for accepting said digital output voltage values and providing a time sequential analog voltage output;

decommutating means for receiving said analog voltage output and decommutating said sequential analog voltage values to provide a plural channel output of seismic analog signals;

means for recording said plural channels of analog seismic signals in the form of a multi-trace seismic representation;

voltage controlled oscillator means generating an output signal the frequency of which establishes a variable basic timing rate;

means for controlling the frequency of the output signal from said voltage controlled oscillator means in proportion to said read out rate of digital voltage values from storage;

means synchronized at said variable basic timing rate for providing an output control signal to said decommutating means such that sequential analog voltage values are assigned to proper channels of said plural channel output; and means synchronized at said variable basic timing rate for controlling the speed of said means for recording the analog seismic signals such that said plural channels of analog seismic signals are represented in true field time relationship.

11. A system for processing multi-trace seismic records as set forth in claim 10 which is further characterized to include:

means synchronized at said variable basic timing rate for generating a digital to analog reference timing signal; and means for recording said digital to analog reference timing signal in parallel with said plural channels of analog seismic signals.

12. A system for retrieving digitally stored multi-trace seismic information for reconstitution in analog form, said digitally stored information having been placed in storage at a constant rate initiated at the zero time of said seismic information, comprising:

means for reading out said stored digital information to generate digital output voltage values at a read out rate which is nominally the same as said constant rate at which said digital equivalent voltage values were stored;

converter means for accepting said digital output voltage values and providing a time sequential analog voltage output;

decommutating means for receiving said analog voltage output and decommutating said sequential analog voltage values to provide a plural channel output of seismic analog signals;

means for recording said plural channels of analog seismic signals in the form of a multi-trace seismic representation;

voltage controlled oscillator means generating an output signal the frequency of which establishes a variable basic timing rate;

means for controlling the frequency of the output signal from said voltage controlled oscillator means in proportion to said read out rate of digital voltage values from storage;

means synchronized at said variable basic timing rate for providing an output control signal to said decommutating means such that sequential analog voltage values are assigned to proper channels of said plural channel output; and means synchronized at said variable basic timing rate for controlling the speed of said means for recording the analog seismic signals such that said plural channels of analog seismic signals are represented in true field time relationship.

13. A system for processing multi-trace seismic records which include plural channels of seismic data, a zero time channel, and a reference timing signal channel which is field recorded as a predetermined frequency, comprising:

analog transport means for playing back said record to provide plural channels of seismic analog signals, a zero time pulse and said reference timing signal;

means for multiplexing said plurality of channels of seismic analog signals to form a single time sequential analog signal;

means for converting said time sequential analog signal to successive binary coded digital voltage values;

means actuated in coincidence with said played back zero time pulse to enable operation of said means for multiplexing and said means for converting;

means receiving said successive binary coded digital voltage values to retain said voltage values in twelve bit intermediate storage;

means including a digital tape transport for accepting said intermediately stored binary coded digital voltage values and storing said twelve bit information in computer-compatable format of two characters per data word at a predetermined digital tape packing density;

oscillator means generating an output signal at a constant frequency, basic timing rate;

synchronous drive means providing rotational drive to said analog transport means;

first means synchronized at said basic timing rate for controlling said synchronous drive means to vary the rotational speed of said analog transport means such that said played back reference timing signal is maintained at said predetermined frequency;

second means synchronized at said basic timing rate for generating constant frequency scan and channel switching signals, said scan signal being applied to control said means for multiplexing at a preset sampling interval of said plurality of channels and said channel switching signal being applied to control said means for multiplexing and means for converting at a preset channel switching interval for each of said plurality of channels; and third means synchronized at said basic timing rate for controlling the storage of said digital voltage values at a constant rate such that the real time of said multi-trace seismic record is retained through the spatial placement of the successive digital voltage values with respect to the first stored digital voltage value.

14. A system for processing multi-trace seismic records as set forth in claim 13 wherein said first means synchronized at said basic timing rate comprises:

first frequency divider means for receiving the output signal from said means generating said basic timing ratae to provide an output phase lock signal at the predetermined frequency;

phase comparator means receiving said played back reference timing signal at one input and said phase lock signal at a second input to provide an output D-C control voltage to said synchronous drive means to effect small corrections through variations of analog transport speed;

encoder means connected to be rotationally driven at the same rate as said analog playback means and generating an output signal having a frequency indicative of rotational speed;

second frequency divider means receiving the output signal from said means generating at said basic timing rate to provide a velocity reference signal output which is indicative of the desired analog transport rotational speed; and frequency comparator means receiving said velocity reference signal at one input and said encoder means output signal at a second input to provide an output D-C control voltage to said synchronous drive means to effect large corrections through variations of analog transport speed.

15. A system for processing multi-trace seismic records as set forth in claim 13 wherein said second and third means synchronized at said basic timing rate, comprise:

first frequency divider means receiving the output signal from said oscillator means and providing a first output signal at a divided frequency to said means including a digital tape transport for controlling the storage of said digital voltage values;

second frequency divider means receiving said first output signal at a divided frequency to provide a second output signal at a further divided frequency at the channel switching rate for application to control said means for multiplexing and said means for converting; and third frequency divider means receiving said second output signal at said channel switching frequency to provide a further divided output signal at said scan switching rate for application to control said means for multiplexing at said preset sampling interval.

16. A system for processing multi-trace seismic records as set forth in claim 14 wherein said first and second frequency divider means comprise:

first frequency divider means receiving the output signal from said means generating said basic timing rate to provide a plurality of output signals each divided at a different ratio from said basic timing rate;

transport speed selector means for selecting one of said plurality of output signals;

second frequency divider means receiving said selected one signal from said selector means and providing an output signal at a further divided frequency;

third frequency divider means receiving said output signal at said further divided frequency to provide said velocity reference signal at its output; and fourth frequency divider means receiving said output signal at said further divided frequency for providing said phase lock signal at its output.

17. A system for processing multi-trace seismic records as set forth in claim 13 which is further characterized to include means providing retrieval of the stored digital information, comprising:

means for reading out stored digital information to generate digital output voltage values at a read out rate which is nominally the same as said constant rate at which said digital equivalent voltage values were stored;

converter means for accepting said digital output voltage values to provide a time sequential analog voltage output;

decommutating means for receiving said analog voltage output and decommutating said sequential analog voltage values to provide a plural channel output of seismic analog signals;

means including analog transport means for recording said plural channels of analog seismic signals in the form of a multi-trace seismic representation;

voltage controlled oscillator means generating an output signal at a variable basic timing rate, said variations being proportional to variations in read out rate of said means for reading out said stored digital information; and means synchronized at said variable basic timing rate for providing scan and channel switching control signals to said decommutating means and for controlling the speed of said analog transport means.

18. A system for processing multi-trace seismic records as set forth in claim 17 which is further characterized to include:

means synchronized at said variable basic timing rate for generating a digital to analog reference timing signal;

means responsive to the initiation of said decommutating means to provide a zero time output signal; and means for applying said digital to analog reference timing signal and said zero time output signal for recording at said analog transport means in parallel with said plural channels of analog seismic signals.

19. A system for processing multi-trace seismic records obtained from a vibratory seismic input signal to the earth which has predetermined duration and unique frequency content, said seismic records including plural channels of seismic data, a zero time channel, and a reference timing signal channel which is field recorded as a predetermined frequency, comprising:

means for playing back said record to provide plural channels of seismic return signals, a zero time signal, and said reference timing signal;

means for correlating said plural channels of seismic return signals and said zero time signal to generate seismic analog output signals and a zero time pulse output;

means for multiplexing said plurality of channels of seismic analog signals to form a single time sequential analog signal;

means for converting said time sequential analog signal to successive digital equivalent voltage values;

means for storing said successive digital equavalents in computer-compatible format;

means generating an output signal at a constant frequency, basic timing rate;

first means synchronized at said constant frequency timing rate and receiving said played back reference timing signal to vary the speed of said means for playing back to thereby continually maintain said reference timing signal at said predetermined frequency as field recorded;

second means synchronized with said constant frequency timing rate for controlling said means for multiplexing and said means for converting such that sampling and analog to digital conversion take place at a constant rate; and third means synchronized at said constant frequency timing rate for controlling the storage of digital equivalent voltage values at a constant rate such that the real time of said multitrace seismic record is retained through the spatial placement of the successive digital equivalents with respect to the first stored digital equivalent.

References Cited

UNITED STATES PATENTS

| | | |
|---|---|---|
| 2,946,044 | 7/1960 | Bolgiano et al. |
| 3,134,957 | 5/1964 | Foote et al. _________ 340—15.5 |
| 3,241,100 | 3/1966 | Loofbourrow _______ 340—15.5 |
| 3,293,608 | 12/1966 | Klein et al. ________ 340—172.5 |
| 3,315,223 | 4/1967 | Hibbard et al. ______ 340—15.5 |
| 3,333,247 | 7/1967 | Hadley et al. ____ 340—15.5 XR |

BENJAMIN A. BORCHELT, *Primary Examiner.*

SAMUEL FEINBERG, *Examiner.*

R. M. SKOLNIK, *Assistant Examiner.*